T863010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1001

782,442

PROCESS FOR PRODUCING MANGANESE DIOXIDE

Thomas H. Larkins, Jr., Howard S. Young, and George A. Akin, all of P.O. Box 511, Kingsport, Tenn. 37662

Filed Dec. 9, 1968. Published June 24, 1969

Int. Cl. C01g *45/02*

U.S. Cl. 23—145

No Drawing. 6 Pages Specification

Manganese dioxide may be recovered from manganese sulfate by treating the manganese sulfate with calcium hydroxide to form manganese hydroxide, treating the manganese hydroxide with nitric acid to form manganese nitrate, and thermally decomposing the manganese nitrate to form manganese dioxide. The process is particularly suitable for producing manganese dioxide in its beta form.